United States Patent
Southerland

(10) Patent No.: US 10,356,046 B2
(45) Date of Patent: Jul. 16, 2019

(54) RESTRICTING COMMUNICATIONS IN INDUSTRIAL CONTROL

(71) Applicant: Derrick Southerland, Johnson City, TN (US)

(72) Inventor: Derrick Southerland, Johnson City, TN (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 484 days.

(21) Appl. No.: 15/028,850

(22) PCT Filed: Sep. 13, 2013

(86) PCT No.: PCT/US2013/059639
§ 371 (c)(1),
(2) Date: Apr. 12, 2016

(87) PCT Pub. No.: WO2015/038142
PCT Pub. Date: Mar. 19, 2015

(65) Prior Publication Data
US 2016/0269363 A1  Sep. 15, 2016

(51) Int. Cl.
*G05B 19/05* (2006.01)
*H04L 29/06* (2006.01)

(52) U.S. Cl.
CPC ........ *H04L 63/0272* (2013.01); *G05B 19/054* (2013.01); *H04L 63/123* (2013.01); *H04L 63/166* (2013.01)

(58) Field of Classification Search
USPC ......................................................... 713/152
See application file for complete search history.

(56) References Cited

U.S. PATENT DOCUMENTS 6,453,210 B1 *  9/2002  Belotserkovskiy .... G06Q 10/06
                                                                  700/96
7,314,169 B1 *  1/2008  Jasper ..................... G06F 21/31
                                                                 235/382

(Continued)

FOREIGN PATENT DOCUMENTS

CN         1781283 A        5/2006
CN       101164026 A        4/2008

(Continued)

OTHER PUBLICATIONS

Qin et al, Sami et al, Virtual_Automation_Networks.*

(Continued)

*Primary Examiner* — Taghi T Arani
*Assistant Examiner* — Badri Narayanan Champakesan

(57) ABSTRACT

Communication in industrial control is restricted (42). Virtual private network functionality is integrated (32) within a programmable logic controller (20) of an industrial control network so that physical access to network interface (16) is insufficient to access information. The programmable logic controller (20) only accepts commands or messages provided through the virtual private network interface (21, 23, 25, 27, 29, 31) and does not accept (42) messages routed directly to the programmable logic controller (20) itself, preventing security breaches in communications.

15 Claims, 2 Drawing Sheets

(56) References Cited

U.S. PATENT DOCUMENTS

| | | | | |
|---|---|---|---|---|
| 7,536,548 | B1* | 5/2009 | Batke | H04L 63/061 713/166 |
| 8,872,638 | B2* | 10/2014 | Akiyama | H04L 67/12 340/3.1 |
| 2002/0156926 | A1* | 10/2002 | Batke | G05B 19/05 709/250 |
| 2004/0103168 | A1* | 5/2004 | Dalton | G05B 19/4187 709/219 |
| 2005/0102525 | A1* | 5/2005 | Akimoto | H04L 63/0236 713/187 |
| 2006/0053491 | A1* | 3/2006 | Khuti | H04L 63/02 726/23 |
| 2007/0073850 | A1* | 3/2007 | Callaghan | G05B 19/05 709/220 |
| 2010/0154051 | A1* | 6/2010 | Bauer | G06F 9/45533 726/15 |
| 2014/0157334 | A1* | 6/2014 | Cavgalar | H04N 21/4135 725/82 |
| 2014/0165182 | A1* | 6/2014 | Curry | H04L 63/0209 726/12 |
| 2014/0380458 | A1* | 12/2014 | Kim | H04L 63/0227 726/13 |
| 2015/0293800 | A1* | 10/2015 | Shivanna | G06F 11/0748 714/37 |
| 2015/0309497 | A1* | 10/2015 | Calvin | G05B 19/056 700/86 |

FOREIGN PATENT DOCUMENTS

| | | | | |
|---|---|---|---|---|
| CN | 101802732 | A | | 8/2010 |
| JP | 2012213033 | A | | 11/2012 |
| JP | 2014075818 | A | * | 4/2014 ............ H03B 5/364 |
| JP | 2014075818 | A | * | 4/2014 ............ H03B 5/364 |
| WO | 2011132502 | A1 | | 10/2011 |

OTHER PUBLICATIONS

International Search Report dated Jun. 25, 2014; PCT/US2013/059639; International Filing Date: Sep. 13, 2013; 13 pages.

Beran J et al: "Virtual Automation Networks", vol. 4, No. 3, Sep. 1, 2010, pp. 20-27, XP011320263 / Jan. 9, 2010.

Eiji Miyagaki et al: :PeerLab: A network testbed for enabling experiments in edge network environment, Access Spaces (ISAS), 2011 1st International Symposium on, IEEE, Jun. 17, 2011 (Jun. 17, 2011), pp. 191-196 XP031903821 / Jun. 17, 2011.

* cited by examiner

RESTRICTING COMMUNICATIONS IN INDUSTRIAL CONTROL

BACKGROUND

The present embodiments relate to communications in an industrial control system (ICS). A programmable logic controller (PLC) is accessed via a transmission control protocol (TCP) connection over an internet protocol (IP) network of an Ethernet network. An attacker with access to the Ethernet or internet protocol (IP) network may be able to intercept communications to and from the programmable logic controller. Intercepted communication traffic may reveal sensitive information about the industrial process being controlled by the programmable logic controller. This sensitive information may include information that would be useful to an attacker in order to further penetrate the target systems, such as passwords. An attacker with access to the network may also send malicious commands to the programmable logic controller to disrupt the industrial process.

Sensitive communications with a programmable logic controller are protected by physically securing networks. The networks are buried or placed in inaccessible locations. Air gaps between control networks and external networks (e.g. the Internet) are often employed. The communications may be protected by encryption at the application layer (layer 7 in the open systems interconnection (OSI) model). Virtual private network (VPN) bridges, which provide encryption at the network layer (layer 3 in the open systems interconnection model), may be used to secure communications. However, undesired access may still be provided through unsecured channels, whether due to lack of physical security or communications security.

BRIEF SUMMARY

By way of introduction, the preferred embodiments described below include methods, systems, instructions, and computer readable media for restricting communication in industrial control. Virtual private network (VPN) functionality is integrated within the programmable logic controller (PLC) so that physical access to a cable may be insufficient to access information. Further communication security is provided by the programmable logic controller only accepting commands or messages provided through the virtual private network (VPN) interface and not accepting messages addressed to the physical interface itself.

In a first aspect, a method is provided for restricting communication in industrial control. A virtual private network is established in an industrial control network. The virtual private network is established with a programmable logic controller as an end point with virtual private network support provided by the programmable logic controller. Access to the programmable logic controller is allowed only by communications addressed to the end point of the virtual private network supported by the programmable logic controller. Access to the programmable logic controller of communications other than the communications addressed to the end point of the virtual private network is prevented.

In a second aspect, a system is provided for restricting communication in industrial control. A cable of an industrial control network connects to a physical interface of a programmable logic controller of the industrial control network. The programmable logic controller is configured for virtual private network communications and configured to only change operation in response to the virtual private network communications and not change operation in response to other network communications received at the physical interface.

In a third aspect, a non-transitory computer readable storage medium has stored therein data representing instructions executable by a programmed processor for restricting communication in industrial control. The storage medium includes instructions for receiving first and second messages at a physical interface of a programmable logic controller, the first message addressed to the programmable logic controller, the second message addressed to a virtual private network node hosted by the programmable logic controller; altering a setting of the programmable logic controller in response to the second message; and preventing access to the programmable logic controller by the first message.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Virtual private network (VPN) communication support is integrated into the programmable logic controller. The integrated virtual private network (VPN) is used to ignore all communication unless the communication arrives via the virtual private network (VPN). The integrated virtual private network (VPN) provides encryption at the network layer (i.e., layer 3 in the open systems interconnection model). The encryption secures the communication against eavesdropping and manipulation. Physical attacks where the attacker disconnects the device's Ethernet cable and substitutes a dummy programmable logic controller or intercepts communications in the cable may be prevented. Attacks where the attacker impersonates a wireless access point or wireless stations are also prevented. Rather than using discrete virtual private network (VPN) bridges and routers which may allow for physical disconnection between the bridge and the programmable logic controller, the virtual private network (VPN) capability is directly integrated into the programmable logic controller. Integrated virtual private network (VPN) support provides the benefits of using a separate virtual private network (VPN) device but without the space requirements. An integrated virtual private network (VPN) may not be bypassed by physical manipulation.

Figure 1:
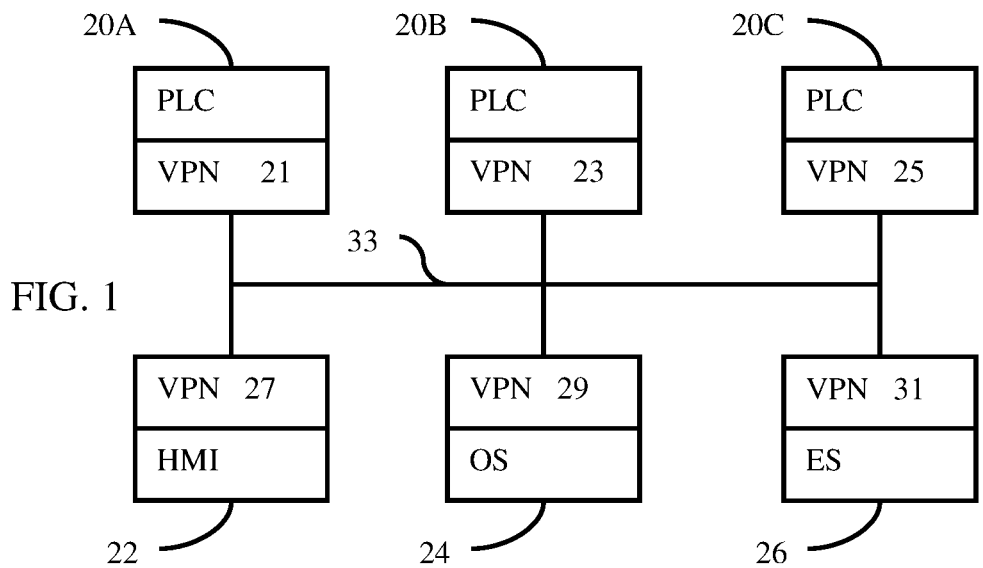
FIG. 1 is a block diagram of one embodiment of a system for restricting communication in industrial control.

FIG. 1 shows a system for restricting communication in industrial control. The system is an industrial control system using an industrial control network. The industrial control network implements industrial processes using field devices. For example, the system may monitor and control a manufacturing process using communications with field devices (e.g., programmable logic controllers or remote terminal units). The system provides control capabilities and may include a user interface for interacting with the control and data acquisition of the process.

The field devices are panels, programmable logic controllers, and/or remote terminal units. In the example of FIG. 1, three programmable logic controllers 20A-C, a human-machine interface device 22, and an operator station 24 are shown. Additional, different, or fewer field devices may be provided. Other controllers, monitors, or devices for monitoring physical processes or characteristics and/or controlling manufacturing or production may be used.

The programmable logic controllers 20A-C are panels, computers, processors, circuits, or other programmable devices for automation of electromechanical, chemical, pneumatic, fluid, electrical, mechanical, or other processes. For example, the programmable logic controllers 20A-C control machinery on assembly lines, heating-ventilation-air conditioning (HVAC), refinery flow, mixing, or other devices or processes. The programmable logic controllers 20A-C output in response to input conditions within a limited time.

For operating, the programmable logic controllers 20A-C may include sensors and/or actuators. The sensors may be temperature, pressure, rate, current, voltage, inductance, capacitance, chemical, flow, or other sensors. Any number of sensors may be used. The actuators may be magnetic, electric, pneumatic, or other devices for altering, moving, drilling, welding, mixing, spinning, changing, or otherwise actuating. The sensors and actuators communicate with or are part of the field devices for control and measuring.

The programmable logic controllers 20A-C may be configured to operate based on programming. The actions to perform and/or the set points for when to perform the actions may be programmed. The work flow or series of actions may be configured. Based on input at a user interface and/or a project provided over the network, the programmable logic controllers 20A-C are configured to control one or more aspects of the industrial process based on triggers and/or report events associated with the industrial process.

To configure the programmable logic controllers 20A-C for operation with the industrial process, communications with set points, programs, or other information are provided. The communications are to or are from one or more of the programmable logic controllers 20A-C.

Figure 2:
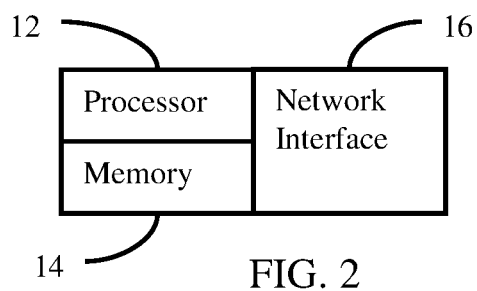
FIG. 2 is a block diagram of one embodiment of a programmable logic controller in an industrial control network of the system of FIG. 1.

FIG. 2 shows one embodiment of one or more of the programmable logic controllers 20A-C, human-machine interface devices 22, operator stations 24, and engineering station 26. The devices are not required to be identical. For example, the programmable logic controllers 20A-C are purpose built to withstand stresses and forces in the industrial environment and/or are computers. The human-machine interface devices 22 are switches or buttons with communications capabilities, computers, or field panels. The operator stations 24 are field panels or computers. The engineering station 26 is a personal computer with one or more cards for interfacing or communicating with the other components.

The components include a processor 12, memory 14, and network interface 16. These parts provide for securing communications in the industrial control network. Additional, different, or fewer parts may be provided. For example, a memory 14 or processor 12 are not provided in a human-machine interface 24. As another example, a display is provided for the engineering station 26 and/or operator station 24. Any type of display may be used, such as light emitting diodes (LEDs), monitor, liquid crystal display (LCD), projector, plasma display, cathode ray tube (CRT), or printer.

The processor 12 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for use in the industrial control network. The processor 12 is a single device or multiple devices operating in serial, parallel, or separately. The processor 12 may be a main processor of a computer, such as a laptop or desktop computer, or may be a processor for handling tasks in a purpose-built system, such as in a programmable logic controller 20A-C. The processor 26 is configured by software and/or hardware.

The memory 14 is a graphics processing memory, video random access memory, system memory, random access memory, cache memory, hard drive, optical media, magnetic media, flash drive, buffer, database, combinations thereof, or other now known or later developed memory device for storing data. The memory 14 stores one or more datasets representing sensor readings, set points, and/or actuator status. The memory 14 may store calculated values or other information for reporting or operating in the network. For example, event data is stored. The memory 14 may buffer or store received communications, such as storing messages for parsing.

The memory 14 or other memory is a non-transitory computer readable storage medium storing data representing instructions executable by the programmed processor 12 for restricting communication in industrial control. The instructions for implementing the processes, methods and/or techniques discussed herein are provided on computer-readable storage media or memories, such as a cache, buffer, random access memory (RAM), removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, central processing unit (CPU), graphics processing unit (GPU), or system.

The network interface 16 is a physical connector and associated electrical communications circuit for networked communications. For example, a network card is provided. In one embodiment, the network interface 16 is an Ethernet connector and corresponding circuit, such as a physical layer (PHY) chip. Alternatively, wireless or other wired connection is provided.

The programmable logic controllers 20A-C have network addresses. The network addresses correspond to the physical network interface 16 for the programmable logic controller 20A-C. Communications within the industrial control network are routed to and from the programmable logic controllers 20A-C over the network. The physical network interfaces 16 connect the programmable logic controllers 20A-C to the industrial control network for receiving and transmitting communications, such as messages.

Referring to FIG. 1, one or more cables 33 interconnect the programmable logic devices 20A-C and other network devices. The cables 33 are Ethernet cables, such as for the connection directly to the interfaces 16 of the programmable logic controllers 20A-C. In other embodiments, other cables, such as shared busses, are used. Wireless connections may be provided instead of or in addition to the cables 33. Any transmission medium may be used, such as a cable, like Ethernet or RS485, or a radio signal, such as wireless fidelity (WiFi) or cellular network, or an optical signal via fiber optic/open air.

Switches and/or routers may be provided to switchably route communications to the desired devices in the industrial control network. The cables 33 provide the paths for communications to and/or from the devices (e.g., programmable logic controllers 20A-C). The switches or routers interconnect the nodes of the industrial control network using other cables or communications (e.g., wireless). The industrial control network includes one or more communications networks. For example, a field network interconnects the field devices. The field network may be wired and/or wireless. Any communications format may be used, such as PROFINET, hyper text transfer protocol (HTTP), file transfer protocol (FTP), Ethernet, or Modbus transmission control protocol (TCP). The field devices communicate to indicate events and to implement control, such as determining the status of operation of one programmable logic controller 20A to control another device with another programmable logic controller 20B.

For establishing secure communications, the engineering station 26 and field devices are configured by software and/or hardware to perform various functions. The engineering station 26 is configured to download operating programs to the field devices. Different field devices (e.g., programmable logic controllers 20A-C) may communicate amongst themselves or with other devices within the industrial control network. Communications may occur with devices in other networks or outside the industrial control network.

Instead of routing the communications using the industrial control network or physical network addresses, virtual private networks (VPNs) are established. Virtual private network (VPN) tunnels are created and maintained or are dynamically created as needed. A virtual network is laid over the industrial control network. This virtual network establishes one or more point-to-point communications tunnels for secure communication. All communications use the virtual private networks (VPNs), or some of the communications may also use the base industrial control network. In alternative embodiments, one or more devices do not use a virtual private network (VPN).

The end-points 21, 23, 25, 27, 29, 31 of the virtual private network (VPN) manage the virtual private network (VPN). For the programmable logic controllers 20A-C, the end-point 21, 23, 25 for the virtual private network (VPN) is the programmable logic controllers 20A-C themselves. The programmable logic controllers 20A-C are configured to support virtual private network communications and to operate in the industrial control network. For example, the processor 12 connects with the interface 16 as well as sensors and actuators directly or indirectly to control the industrial processing, and the processor also manages virtual private network (VPN) communications.

The programmable logic controllers 20A-C are configured by hardware (e.g., a chip) and/or software to support virtual private network (VPN) communications. This integrated virtual private network (VPN) support allows the programmable logic controllers 20A-C, without an added component (e.g., bridge) outside the housing of the programmable logic controllers 20A-C, to accept and process virtual private network (VPN) communications.

Any virtual private network (VPN) and corresponding support may be used. For example, the programmable logic controllers 20A-C are pre-loaded with or obtain a certificate or key for encryption and decryption. The end-points of the virtual private network (VPN) connection share public keys or information allowing encryption and decryption of communications. Other security may be used. In one embodiment, the security is provided by use of the unique virtual private network (VPN) addressing. The virtual private network (VPN) addresses are created when needed or when a tunnel is formed and provided only between end-points sharing the virtual private network (VPN). Secure sockets layer/transport layer security (SSL/TLS), Internet protocol security (IPsec), or other secure communications may be used. The support may be algorithms to establish the virtual private network (VPN) and/or to operate as a virtual private network (VPN) end-point.

The programmable logic controllers 20A-C may receive communications from different networks. For example, messages are received on the industrial control network addressed to and formatted for the programmable logic controller 20A-C, and messages are received on the virtual private network (VPN) addressed to and formatted for the virtual private network (VPN) end-point hosted by the programmable logic controllers 20A-C. Similarly, the programmable logic controllers 20A-C transmit messages addressed and formatted for use of the industrial control network or the virtual private network (VPN). The transmissions and receptions occur using the same physical interface 16 of the programmable logic controller 20A-C, but have different addressing, security, and/or formatting.

To provide additional security, the programmable logic controllers 20A-C are configured to only change operation in response to the virtual private network (VPN) communications and not change operation in response to other network communications received at the physical interface 16. If the message is a virtual private network (VPN) communication (e.g., addressed, secured and/or formatted for the virtual private network, the programmable logic controller 20A-C acts on the message. A response may be sent, the message may be parsed, settings may be changed, a sequence may be changed, or other change in operation may occur. The change in operation is relative to the industrial process and/or interaction on a network (e.g., virtual private network or industrial control network). If the message is a virtual private network (VPN) communication, the programmable logic controller 20A-C may alter what, when, or how a process implemented by the programmable logic controller 20A-C occurs. If the message is a virtual private network (VPN) communication, the programmable logic controller 20A-C may respond or process the message.

If the message is other than a virtual private network (VPN) communication, such as being addressed using the industrial control network and not the virtual private network (VPN) end-point address, the communication is not used to change operation. A response may not be sent. A setting or process may not change despite the message requesting change. The message is dropped, not buffered, not parsed, and/or not acted upon. In other embodiments, the non-virtual private network (VPN) message is saved and/or transmitted for analysis as an error or anomaly.

When the industrial control network is set-up manually or automatically, the virtual private network (VPN) may not exist. Messages for configuring the industrial control network may be allowed. Similarly, messages for configuring or setting-up the virtual private network (VPN) may be allowed. Once the virtual private network (VPN) exists on a functional network backbone (e.g., industrial control network), the messaging is limited to only virtual private network (VPN) communications. In other embodiments, the limitation to only virtual private network (VPN) communications applies just to one or more classes of messages. For example, the virtual private network (VPN) only limitation is applied to any message associated with industrial process control. Messages associated with network maintenance, configuration, or use are not limited to only virtual private network (VPN). The reverse (e.g., virtual private network (VPN) only limit for network and not industrial control messages) may be used. Other classes of messages may have the same or different limitations.

Figure 3:
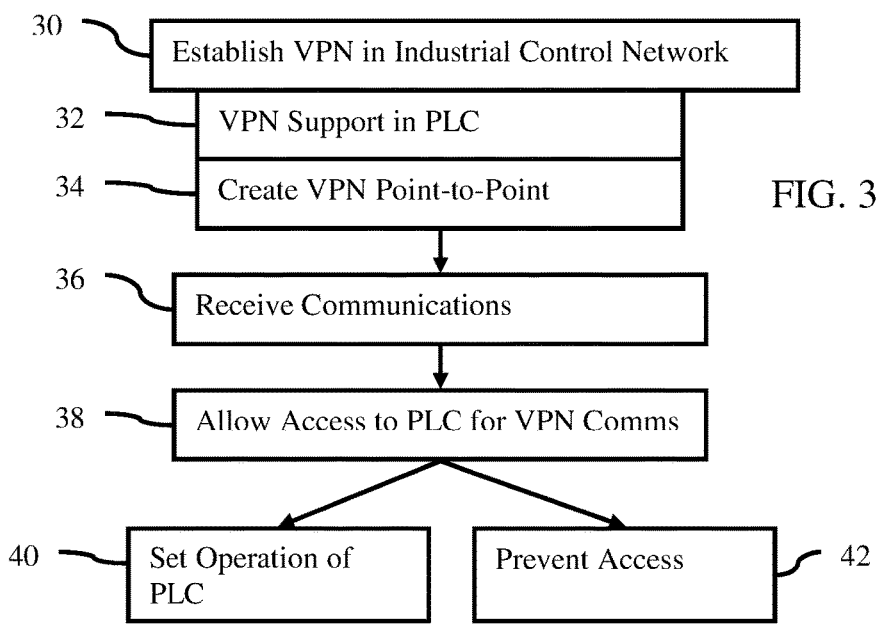
FIG. 3 is a flow chart diagram of one embodiment of a method for restricting communication in industrial control.

FIG. 3 shows a method for restricting communication in industrial control. The method is implemented by the system of FIG. 1, a component of FIG. 2, or another system and/or component. The acts are performed in the order shown or other orders. For example, acts 38 and 42 are performed at a same time as part of a same process.

Additional, different, or fewer acts may be provided. For example, the acts of FIG. 3 focus on the operations of the programmable logic controller. Additional or different acts are provided for other devices of the industrial control network using virtual private network (VPN) communications. For example, acts 38 and 42 for limiting communications or processing based on communications are or are not performed for or by other end-points or other field devices.

The industrial control network is commissioned. The components are placed and connected. The networked components are powered on and any tests are performed to confirm operation of the components and the network. Any acts for provisioning the industrial control system (industrial control network) are performed. The commissioning may occur in a known-good environment. The networked components are configured to operate without connection external to the industrial control system. Alternatively, the commissioning may occur in an environment where the network connects with another network.

The commissioning may include acts to arrange for and to exchange security tokens for establishing secure communications. In other embodiments, the commissioning is completed, and the exchange of security tokens occurs after commissioning and before operation of the industrial control process. In yet other embodiments, the industrial control network does not use security tokens.

Peers between the programmable logic controllers 20A-C, human machine interface devices 22, engineering station 26, and/or operator stations 24 may be established in the industrial control network. To establish peers, the identities are read from the field devices. Messaging may be used to obtain the identities. Because the engineering station 26 may have access to all of the field devices on the network, the engineering station 26 retrieves the physical or logical identifiers from each of the field devices. Alternatively, a broadcast, neighbor discovery, or query system is used to determine identities. The field devices may be programmed to seek out specific other devices of the industrial control network.

Figure 4:
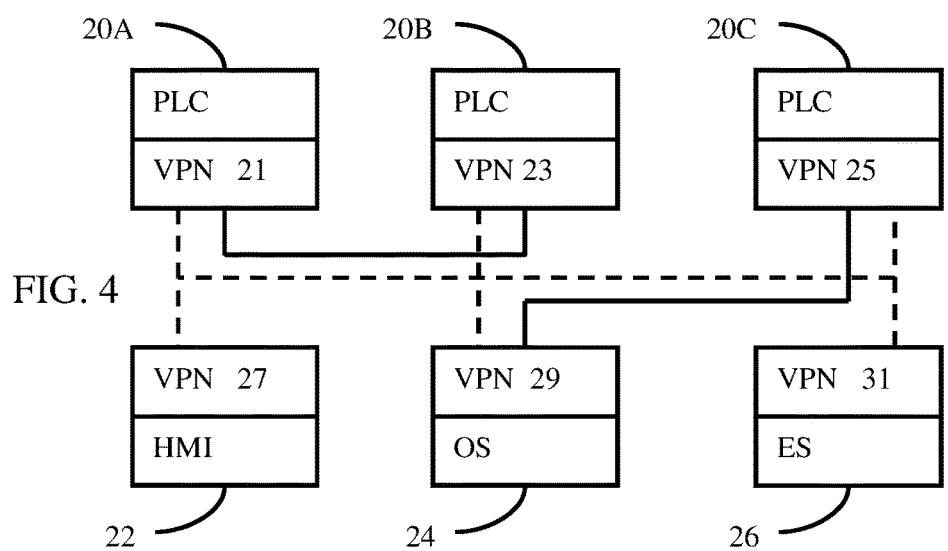
FIG. 4 is a block diagram of the system of FIG. 1 with established virtual private network (VPN) communications.

Once communications are established and/or secured for the industrial control network, one or more virtual private networks (VPNs) may be established using the industrial control network. The virtual private network (VPN) or virtual private networks (VPNs) are established between peers in act 30. For example, FIG. 4 shows the industrial control network of FIG. 1, but with connections for which communications are to occur in normal operation of the industrial control process. The programmable logic controllers 20A and 20B are to communicate. The programmable logic controller 20C is to communicate with the operator station 24. The engineering station 26 or other supervisor or administrator control may communicate with all of the devices. Groups of more than two devices may be formed.

Virtual private networks (VPNs) are established for the peer groups. Different virtual private networks (VPNs) are provided for different groups. Within a group, a single virtual private network (VPN) is used. Alternatively, more than one virtual private network (VPN) may be used within a group. For example, three devices are to communicate. Three separate point-to-point virtual private networks (VPNs) are created to provide for the communications.

The virtual private network (VPN) or virtual private networks (VPNs) are established in the industrial control network or other industrial control network. The devices of the industrial control network are used to host the virtual nodes of the virtual private network (VPN). The backbone (e.g., cabling and/or communications channels) of the industrial control network is used to transmit and receive virtual private network (VPN) communications.

The programmable logic controllers and other devices are established as end points of the virtual private networks (VPNs). In act 32, the programmable logic controllers provide virtual private network (VPN) support. Virtual private network (VPN) software and/or hardware are included in or integrated with the programmable logic controllers. The tunneling, negotiating, verifying, or other acts for creating the virtual private network (VPN) are performed, at least in part, by the processor or other components of the programmable logic controllers. By having virtual private network (VPN) support, the programmable logic controller is capable of hosting an end-point of the virtual private network (VPN). Secured virtual private network (VPN) communications are decrypted by the programmable logic controller, so there is no gap to intercept or insert non-encrypted messages.

The same processor controls or is part of controlling an industrial process and supports virtual private network (VPN). The resources of the programmable logic controller are shared for both industrial control and virtual private network (VPN) support. The software and/or hardware supporting the virtual private network (VPN) are in a same housing as the rest of the programmable logic controller. Different processors may be used for the virtual private network (VPN) support and industrial control in the same programmable logic controller.

In act 34, a point-to-point connection is created for the virtual private network (VPN). A tunnel is created to provide communications between two end-points. Different devices host the end-points. The virtual private network (VPN) is established at the Open Systems Interconnection network or data link layer. The physical interface of the programmable logic controller is used for the virtual private network (VPN).

Since the virtual network is being created, the end-points of the virtual private network (VPN) are assigned or create separate addresses. The hosting device has a different address for the base network (e.g., industrial control network) and for the virtual network. These virtual private network (VPN) addresses are used for communicating in the virtual private network (VPN).

The virtual private network (VPN) support authenticates the other end-point, such as by certificate exchange, checking from a trusted source, looking-up from a table, or other authentication. Any authentication may be used.

The virtual private network (VPN) support of the programmable logic controller provisions security and/or formatting for the virtual private network (VPN). Encryption and decryption may be provisioned by the exchange of keys, certificates, or tokens. Rather than exchange, pre-stored information may be used to provision security. In one embodiment, security of communications for the virtual private network (VPN) is established pursuant to Internet protocol security (IPsec) or secure sockets layer/transport layer security (SSL/TLS). Other protocols may be used.

In one embodiment, a key-exchange is used. Any key-exchange algorithm may be used. Hypertext transfer protocol secure (HTTPS), internet protocol security (IPSEC), secure sockets layer (SSL), public key infrastructure (PKI) or other cryptographic method may be used. For example, the virtual private network (VPN) support randomly generates key pairs. One private key is kept by the component and the other public key is sent to the peer. Each peer receives a key for encrypting messages and/or digital signatures. The keys are the security tokens. Symmetric or asymmetric (e.g., Rivest-Shamir-Adleman (RSA)) key algorithms may be used. In another example, a stateful connection is negotiated using a handshaking procedure. The lead end-point sends a digital certificate to the other end-point. The other end-point may or may not likewise send digital certificates to the lead end-point. The certificates may be used to generate shared secrets between the end-points for later authentication and/or encryption. The shared secret and/or the certificates are security tokens. In yet another example, the engineering station acts as an authentication server in a public key infrastructure (PKI) system. As another example, preloaded and negotiated keys are used and the exchange algorithm confirms operability using the preloaded keys.

In act 36, communications occur using the established virtual private network (VPN) and/or the control network. The programmable logic controller may route messages to be transmitted to the virtual private network (VPN) end-point hosted by the programmable logic controller. The messages are transmitted from the programmable logic controller over the virtual private network (VPN) rather than with the addressing, security, and/or format of the industrial control network. Alternatively, the messages use the different addressing, security, and/or format of the industrial control network.

Similarly, messages destined for the programmable logic controller are received at the physical interface. The received messages are addressed, secured, and/or formatted for the industrial control network or for the virtual private network (VPN) node. Messages addressed for the virtual private network (VPN) may include industrial control network address information, but also include the virtual private network (VPN) address. Conversely, messages for the industrial control network do not include the virtual private network (VPN) information.

The received message or messages are decrypted if encrypted. The decryption used is based on the addressing or network used for communication. The format of the message and/or security (e.g., type of encryption, key or other aspect of security) appropriate for the industrial control network may not be appropriate for the virtual private network (VPN) and vice versa. Even if the same type of encryption is used, the virtual private network (VPN) uses a different key or certificate than the industrial control network. Decrypting using the wrong key prevents use of the message, so the decryption appropriate for the type of message is applied. A virtual private network (VPN) message is decrypted as appropriate for the virtual private network (VPN).

In acts 38 and 42, access is or is not allowed to the programmable logic controller. Access may be further message processing, such as using resources of the programmable logic controller to parse and read a message. Access may be to settings or operation of the programmable logic controller. For example, a set point, event log read-out, configuration, or other industrial control characteristic is altered. Access may be to network configuration. For example, the programmable logic controller is changed to use a different format, address, peer, or other operation associated with communications over the network. The access may be for control network administration. Any ability to read data from, elicit a response from, or change operation of the programmable logic controller uses access to the controller.

The requests for access are included in one or more messages. The message may request information, request a change in operation, or include other information relying on access to the programmable logic controller. The messages may be command messages.

In act 38, the access is allowed for messages received on the virtual private network (VPN). Messages addressed, secured, and/or formatted for the virtual private network (VPN) as opposed to the industrial control network are processed in order to allow access. Message processing of the programmable logic controller is permitted for virtual private network (VPN) messaging. The messages are decrypted and parsed. Actions corresponding to the message content or payload are performed by the programmable logic controller. The programmable logic controller operates according to the message.

In act 40, the operation of the programmable logic controller changes according to the access. A setting is altered in response to the message or messages. The settings are set points, processes, configuration, or other values of variables that alter operation of the programmable logic controller. The control of the industrial equipment or process is changed based on a value provided in the message. Network, communications, administration, or other operation may be altered.

In act 42, access is prevented. Access to the programmable logic controller is prevented for communications other than virtual private network (VPN) communications. If the address, security, and/or formatting of the message are for the industrial control network or other industrial control network and not for the virtual private network (VPN) hosted by the network, access is prevented. The message is not parsed or processed. Even if parsed or processed, the access to the industrial control aspects of the operation are prevented. Set points or other control processing is not altered in response to the message even if the message includes a payload requesting or instructing the alteration. Access is only granted in response to messages received via the virtual private network (VPN).

Other messages may be dropped, not processed, processed but not implemented, or handled pursuant to an exception process. For example, the non-virtual private network (VPN) communications are ignored. If the address is to the programmable logic controller and not the end-point of the virtual private network (VPN) hosted by the controller, the message is not processed or operated on.

The prevention is for all messages received by the programmable logic controller using other communications than the virtual private network (VPN). Alternatively, the prevention is for all messages of a particular type. Messages corresponding to network administration, industrial process control, or network communication may be have different access and prevention controls. For example, the messaging is allowed and prevented in acts 38 and 42 for all messages dealing with industrial process control. Different standards, such as only allowing access for non-virtual private network (VPN) messages, may be used for other types of messages, such as network administration messages for the industrial control network.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A method for restricting communication in industrial control, the method comprising:
   establishing a virtual private network in an industrial control network, the virtual private network established with a programmable logic controller as an end point with virtual private network support provided by the programmable logic controller, the end point being integrated into the programmable logic controller,
      wherein the programmable logic controller comprises a sensor and an actuator and controls an industrial process by providing outputs in response to input conditions utilizing the sensor and the actuator;
   allowing access to the programmable logic controller only by communications addressed to the end point of the virtual private network supported by the programmable logic controller; and
   preventing the access to the programmable logic controller of communications other than the communications addressed to the end point of the virtual private network, wherein preventing comprises saving or transmitting the communications other than the communications addressed to the end point of the virtual private network (non-VPN messages) for analysis as an error or anomaly,
   wherein, when the access is allowed to the programmable logic controller, a setting of the programmable logic controller is altered in response to the communications addressed to the end point, the setting comprising a set point, a process, a configuration, or a value of a variable that alters operation of the programmable logic controller.

2. The method of claim 1, wherein establishing comprises creating a point-to-point connection with a separate address for the end point than for the programmable logic controller.

3. The method of claim 1, wherein establishing comprises provisioning encryption and decryption by the programmable logic controller.

4. The method of claim 1, wherein establishing comprises supporting the virtual private network with the support in the programmable logic controller operated by a processor, the processor configured to also operate the programmable logic controller for industrial control.

5. The method of claim 1, wherein establishing comprises establishing the virtual private network at an Open Systems Interconnection network or data link layer.

6. The method of claim 1, wherein establishing comprises establishing with the support integrated as software, hardware, or software and hardware in a housing of the programmable logic controller.

7. The method of claim 1, wherein establishing comprises establishing pursuant to Internet protocol security (IPsec) or transport layer security (SSL/TLS).

8. The method of claim 1, wherein establishing comprises authenticating by the virtual private network support of the programmable logic controller.

9. The method of claim 1, wherein allowing comprises permitting operation of the programmable logic controller based on the communications addressed to the end point of the virtual private network and wherein preventing comprises ignoring the communications addressed to an address of the programmable logic controller other than an address of the end point of the virtual private network.

10. The method of claim 1, wherein allowing and preventing comprise dropping the communications destined for the programmable logic controller other than on a virtual private network interface established by the virtual private network support.

11. A system for restricting communication in industrial control, the system comprising:
   a programmable logic controller of an industrial control network, wherein the programmable logic controller comprises a sensor and an actuator and controls an industrial process by providing outputs in response to input conditions utilizing the sensor and the actuator; and
   a transmission medium of the industrial control network connected to a physical interface of the programmable logic controller;
   wherein the programmable logic controller is configured to
      establish a virtual private network in the industrial control network, the programmable logic controller comprising an end point with virtual private network support, the end point being integrated into the programmable logic controller;
      allow access to the programmable logic controller only by communications addressed to the end point of the virtual private network; and
      prevent the access to the programmable logic controller of communications other than the communications addressed to the end point of the virtual private network, wherein the communications other than the communications addressed to the end point of the virtual private network (non-VPN messages) are saved or transmitted for analysis as an error or anomaly,
   wherein, when the access is allowed to the programmable logic controller, a setting of the programmable logic controller is altered in response to the communications addressed to the end point, the setting comprising a set point, a process, a configuration, or a value of a variable that alters operation of the programmable logic controller.

12. The system of claim 11, wherein the transmission medium comprises an Ethernet cable.

13. The system of claim 11, wherein the programmable logic controller is configured to encrypt and decrypt the virtual private network communications.

14. The system of claim 11, wherein the programmable logic controller comprises a processor operable to change the operation of the programmable logic controller for industrial control and to support the virtual private network communications.

15. The system of claim 11, wherein the programmable logic controller is configured to drop the other network communications and to respond to the virtual private network communications addressed to a virtual private network address corresponding to the programmable logic controller and different than an address of the physical interface of the programmable logic controller.

* * * * *